(12) United States Patent
Vickers

(10) Patent No.: US 10,544,051 B2
(45) Date of Patent: Jan. 28, 2020

(54) DESALINATION UNIT WITH ELECTRICITY GENERATION

(71) Applicant: Joe Lynn Vickers, Frankston, TX (US)

(72) Inventor: Joe Lynn Vickers, Frankston, TX (US)

(*) Notice: Subject to any disclaimer, the term of this patent is extended or adjusted under 35 U.S.C. 154(b) by 0 days.

(21) Appl. No.: 15/633,836

(22) Filed: Jun. 27, 2017

(65) Prior Publication Data

US 2017/0369332 A1    Dec. 28, 2017

Related U.S. Application Data

(60) Provisional application No. 62/354,923, filed on Jun. 27, 2016.

(51) Int. Cl.

| | | |
|---|---|---|
| *C02F 1/16* | (2006.01) | |
| *B01D 1/00* | (2006.01) | |
| *B01D 5/00* | (2006.01) | |
| *C02F 1/04* | (2006.01) | |
| *B01D 53/14* | (2006.01) | |
| *F01K 23/10* | (2006.01) | |
| *C02F 103/08* | (2006.01) | |
| *F01K 11/00* | (2006.01) | |

(52) U.S. Cl.
CPC .............. *C02F 1/16* (2013.01); *B01D 1/0058* (2013.01); *B01D 5/006* (2013.01); *B01D 5/0054* (2013.01); *B01D 53/1475* (2013.01); *C02F 1/048* (2013.01); *F01K 23/10* (2013.01); *C02F 2103/08* (2013.01); *F01K 11/00* (2013.01)

(58) Field of Classification Search
CPC .. B01D 1/00; B01D 1/0058; B01D 2257/504; B01D 53/1475; B01D 5/0054; B01D 5/006; C02F 1/048; C02F 1/16; C02F 2103/08; F01K 11/00; F01K 23/10; F16T 1/00

See application file for complete search history.

(56) References Cited

U.S. PATENT DOCUMENTS 8,545,681 B2 * 10/2013 Shapiro .................... C02F 1/16
203/10

OTHER PUBLICATIONS

Rao, A., et al, a Technical, Economic, and Environmental Assessment of CO2 Capture Technology for Power Plant Greenhouse Gas Control, Environ. Sci. Tech., 2002, vol. 36, 4467-4475. (Year: 2002).*

Lee, U., et al., Carbon Dioxide Liquefaction Process for Ship Transportation, Industrial & Engineering Chemistry Research, 2012, ACS, vol. 51 pp. 15122-15131. (Year: 2012).*

* cited by examiner

*Primary Examiner* — Renee Robinson
*Assistant Examiner* — Derek N Mueller
(74) *Attorney, Agent, or Firm* — BakerHostetler

(57) ABSTRACT

A system for processing saltwater or brackish water while recovering energy otherwise wasted in electricity generation by a natural gas generator or turbine. Heat in the generator exhaust is used to directly heat and process the water in the saltwater or brackish water into high quality steam, separating the majority of salt and contaminants from the water, and leaving potable water that can be permitted and released to the environment or sold for agricultural or industrial use such as oilfield activities. The system also captures and liquefies $CO_2$ in the generator exhaust.

8 Claims, 1 Drawing Sheet

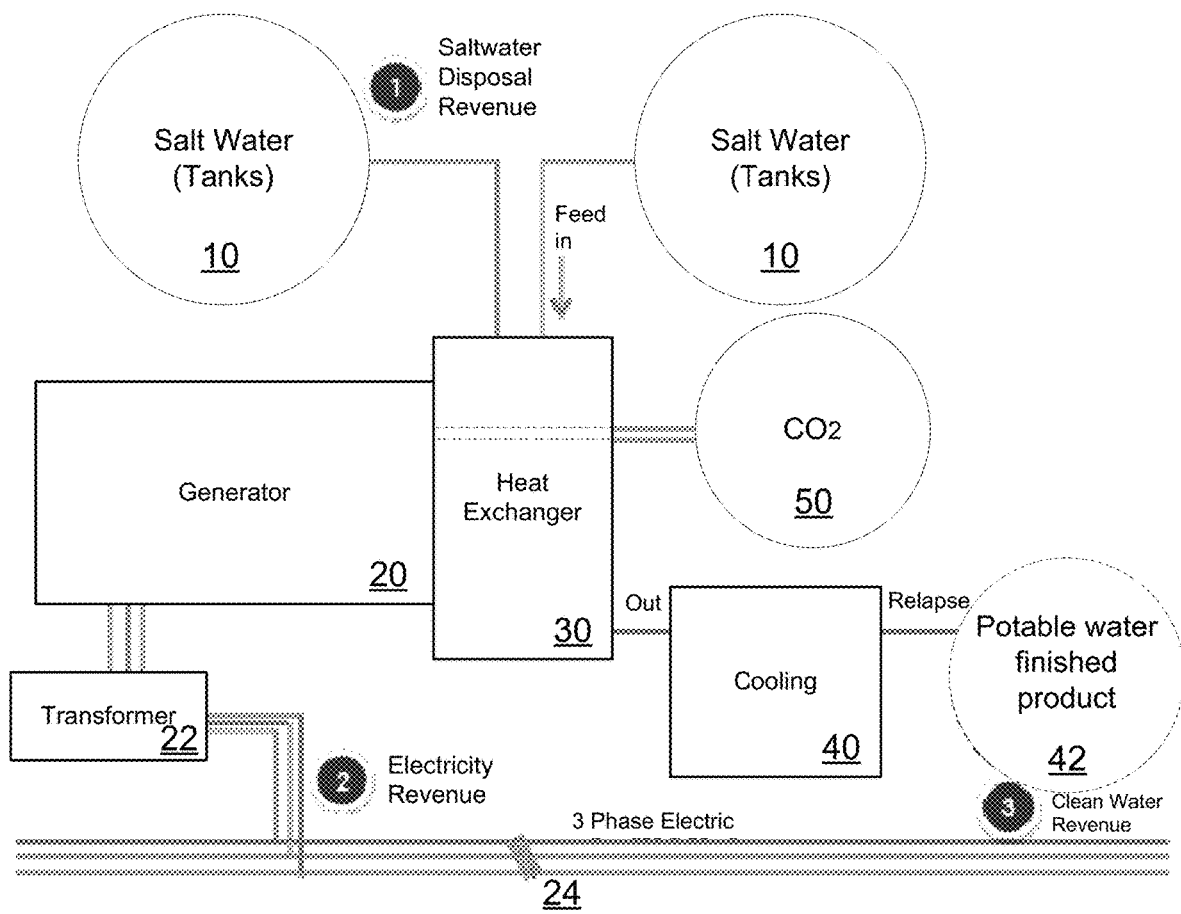

DESALINATION UNIT WITH ELECTRICITY GENERATION

This application claims benefit of and priority to U.S. Provisional Application No. 62/354,923, filed Jun. 27, 2016, and is entitled to that filing date for priority. The specification, figures, and complete disclosure of U.S. Provisional Application No. 62/354,923 are incorporated herein in their entireties by specific reference for all purposes.

FIELD OF INVENTION

This invention relates to a desalination unit for saltwater treatment and disposal. More particularly, this invention relates to a desalination unit with a natural gas electrical generator that treats saltwater from a variety of sources, such as produced water from oilfield operation, or saltwater or brackish water at a desalination plant for creation of potable water.

BACKGROUND OF INVENTION

Various processes for the desalination of saltwater and brackish water are known in the art. Examples of processes and system for desalination are disclosed in el Din Nasser, U.S. Pat. No. 4,511,436; Weinberger, et al., U.S. Pat. No. 5,582,690; and Kamiya, et al., U.S. Pat. No. 6,391,162; all of which are incorporated herein in their entireties by specific reference for all purposes. In general, desalination processes apply some form of energy, such as heat, to the saltwater and brackish water, causing the water to evaporate or vaporize, leaving behind salt and other contaminants.

Gas-powered turbines and electrical generators also are known in the prior art. Examples of gas-powered turbines and generators are disclosed in Yamanaka, et al., U.S. Pat. No. 7,114,322 and Ziegenfuss, U.S. Pat. No. 7,958,716, both of which are incorporated herein in their entireties by specific reference for all purposes. Electrical generators of this sort produce exhaust streams with excess heat and various gases, such as carbon dioxide. Such exhaust streams often are wastefully emitted into the ambient environment.

SUMMARY OF INVENTION

In various embodiments, the present invention comprises a saltwater or brackish water processing system that receives and stores saltwater in one or more storage areas or tanks. The saltwater can come from a variety of sources, such as produced water from oilfield operation, or saltwater or brackish water at a desalination plant for creation of potable water. From the storage area or tanks, the saltwater is directed to a or desalination plant or facility or heat exchanger connected to a natural gas electrical generator, which may be operated for a variety of purposes, such as, but not limited to, generating electricity through a transformer to be sold to a local electric utility grid, or to be used locally for private electric power purposes.

Heat created by the natural gas generator during generation of electricity exits through an exhaust flue, and is used to heat and process the saltwater in the heat exchanger. The application of heat turns the water in the saltwater into high quality steam, thereby separating the majority of salt and contaminants in the saltwater from the water. The steam is condensed as potable water and directed into a cooling pond or apparatus, and subject to further treatment, if necessary. The potable water can then be discharged into a local waterway (with proper permitting), or used for local irrigation or agricultural purposes. In a further embodiment, high quality carbon dioxide ($CO_2$) from the generator flue exhaust also is recovered, converted to liquid, and sold for industrial processes or used locally, such as, but not limited to, in a greenhouse.

BRIEF DESCRIPTION OF THE DRAWINGS

FIG. 1 shows a view of a system in accordance with an embodiment of the present invention.

DETAILED DESCRIPTION OF EXEMPLARY EMBODIMENTS

In various exemplary embodiments, as seen in FIG. 1, the present system provides a saltwater processing system that receives and stores saltwater in one or more storage areas or tanks 10. The saltwater can come from a variety of sources, such as produced water from oilfield operation, or saltwater or brackish water at a desalination plant for creation of potable water.

From the storage area or tanks, the saltwater is directed to a or desalination plant or facility or heat exchanger 30 connected to a natural gas electrical generator 20, which may be operated for a variety of purposes, such as, but not limited to, generating electricity through a transformer 22 to be sold to a local electric utility grid 24, or to be used locally for private electric power purposes. Heat created by the natural gas generator during generation of electricity exits through an exhaust flue, and is used to heat and process the saltwater in the heat exchanger 30. The application of heat turns the water into high quality steam, thereby separating the majority of salt and contaminants in the saltwater from the water.

The steam is condensed in a condenser or similar unit as potable water and directed into a cooling pond or apparatus 40, and subject to further treatment, if necessary. The potable water 42 can then be discharged into a local waterway (with proper permitting), or used for local irrigation or agricultural purposes.

In a further embodiment, high quality carbon dioxide ($CO_2$) 50 from the generator flue exhaust also is recovered (such as through a carbon dioxide scrubber), converted to liquid, and sold for industrial processes or used locally, such as, but not limited to, in a greenhouse. Examples of processes for removing and liquefying carbon dioxide from such exhaust streams are described in Fujii, et al., U.S. Pat. No. 5,344,627; Rongved, U.S. Pat. Nos. 6,180,012; and 8,828,130; all of which are incorporated herein in their entireties by specific reference for all purposes.

There are multiple revenue streams generated by the present system. First is the revenue derived for handling oilfield saltwater processing and disposal. The present invention further possesses the advantage of avoiding injection of the saltwater into the underground strata, and thereby avoids adverse environmental impacts such as, but not limited to, downhole pumping, chemical dumping, groundwater contamination, and earthquakes or earth movements.

The second revenue stream is the revenue received from sale of the electricity generated. The third revenue stream is the revenue received from sale of the potable water. And a fourth revenue stream is the revenue received from sale of the processed carbon dioxide.

The system thus processes saltwater while recovering energy otherwise wasted in electricity generation by the natural gas generator. The present invention uses the heat and carbon dioxide in the generator exhaust to achieve a very high efficiency gain efficiency gain, thereby providing a cost-effective, environmentally-sound solution for oilfield and brackish saltwater treatment and disposal. In one exemplary embodiment, the present invention results in an overall 80% efficiency gain.

The natural gas generator has multiple purposes, one of which is to create electricity to be sold into the local electric utility grid. It can also be used locally for private or micro grid electric power applications, or combinations thereof. Natural gas generators can be utilized with a variety of natural gas applications such as oilfield flare gas and landfill methane, thereby utilizing and reducing waste gases that would otherwise contribute to global greenhouse gas accumulation. The process creates a highly useful, efficient, commercially viable environment for the disposal of waste flare gas (greenhouse gas), processes oilfield salt water waste (highly toxic and environmentally damaging when pumped underground to saltwater disposal wells which creates local earthquakes and groundwater contamination), captures waste $CO_2$ in a highly efficient form (greenhouse gas), and releases potable water for downstream consumption in various forms.

The extreme heat released by the natural gas generator exhaust flue is used to heat and process the water into high quality steam, separating the majority of salt and contaminants from the water, leaving potable water that can be permitted and released to the environment or sold for agricultural or industrial use such as oilfield activities. This saltwater processing for oilfield solutions provides a solid revenue stream with greatly reduced environmental impacts such as earthquakes, downhole pumping, chemical dumping, or groundwater contamination. The processed water will be directed into a permitted cooling pond or apparatus, not injected into underground strata. The processed water will instead be permitted to be placed into a local stream or local irrigation as potable water and sold as a third revenue stream. An additional system will recover high pressure $CO_2$ derived from the system using high pressure steam generated by the unit. This high pressure $CO_2$ is salvaged, converted to liquid, and sold or used for industrial or agricultural processes as a fourth revenue stream, reducing $CO_2$ output to the atmosphere and reducing output of greenhouse gases.

The present invention thus recovers the energy wasted through electrical energy generation, heat, and exhaust, and maximizes efficiency of the energy processes associated with generation, desalination and $CO_2$ recovery by capturing these processes as they occur. The present invention thus provides for an ultra-high efficiency impact from the electricity generation unit with the coupling of these systems from standard industrial practices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A desalination system, comprising:
   a natural gas electricity generator adapted to generate electricity through natural gas combustion, further generating an exhaust stream comprising heat and carbon dioxide;
   a heat exchanger adapted to receive the generator exhaust and directly receive a saltwater stream and to apply the heat from the generator exhaust to said saltwater stream comprising water, salt and contaminants, within the heat exchanger thereby separating the water from a majority of the salt and contaminants by converting the water to steam; and
   a condenser adapted to condense the steam to distilled water.

2. The system of claim 1, further comprising a carbon dioxide scrubber adapted to remove carbon dioxide from the exhaust stream.

3. The system of claim 1, further comprising a storage area in fluid communication with the heat exchanger, wherein the storage area stores the water having the salt and contaminants.

4. The system of claim 2, wherein the carbon dioxide scrubber is further adapted to liquify and store the removed carbon dioxide.

5. A method for conserving energy in a desalination unit, comprising the steps of:
   providing natural gas to a natural gas electrical generator;
   operating the natural gas electrical generator to generate electricity and an exhaust stream comprising heat and carbon dioxide;
   storing saltwater or brackish water with one or more contaminants or salt or combinations thereof in a storage area;
   directing the saltwater or brackish water into a heat exchanger;
   directing the exhaust stream into said heat exchanger, applying heat from the exhaust stream within the heat exchanger to convert water in the saltwater or brackish water within the heat exchanger to steam;
   removing the steam to leave behind a majority of said one or more contaminants or salt or combinations thereof; and
   condensing the steam to produce distilled water.

6. The method of claim 5, further comprising the steps of:
   removing carbon dioxide from the exhaust; and
   liquefying the carbon dioxide.

7. The method of claim 6, further comprising the steps of:
   receiving revenue for treatment of the saltwater or brackish water;
   receiving revenue from sale of the generated electricity;
   receiving revenue from sale of the carbon dioxide; and
   receiving revenue from sale of the distilled water.

8. The method of claim 7, further comprising the step of generating electricity through a transformer prior to the step of receiving revenue from sale of the generated electricity.

* * * * *